US010308847B1

(12) United States Patent
Dickens

(10) Patent No.: US 10,308,847 B1
(45) Date of Patent: Jun. 4, 2019

(54) PRESSURE SENSITIVE, WATERPROOF ADHESIVE COMPOSITIONS

(71) Applicant: Carroll Benford Dickens, Santa Ana, CA (US)

(72) Inventor: Carroll Benford Dickens, Santa Ana, CA (US)

( * ) Notice: Subject to any disclaimer, the term of this patent is extended or adjusted under 35 U.S.C. 154(b) by 0 days.

(21) Appl. No.: 15/583,344

(22) Filed: May 1, 2017

Related U.S. Application Data

(63) Continuation-in-part of application No. 15/043,075, filed on Feb. 12, 2016, now Pat. No. 9,822,288, which is a continuation-in-part of application No. 14/376,112, filed as application No. PCT/US2013/024314 on Feb. 1, 2013, now abandoned, which is a continuation-in-part of application No. 13/365,850, filed on Feb. 3, 2012, now Pat. No. 9,068,103.

(60) Provisional application No. 61/439,271, filed on Feb. 3, 2011.

(51) Int. Cl.

| | |
|---|---|
| ***C09J 175/04*** | (2006.01) |
| ***C09J 9/02*** | (2006.01) |
| ***C09J 5/00*** | (2006.01) |
| ***B32B 37/12*** | (2006.01) |
| *C08K 3/04* | (2006.01) |

(52) U.S. Cl.
CPC ............. *C09J 175/04* (2013.01); *B32B 37/12* (2013.01); *C09J 5/00* (2013.01); *C09J 9/02* (2013.01); *B32B 2419/04* (2013.01); *C08K 3/046* (2017.05); *C09J 2475/00* (2013.01)

(58) Field of Classification Search
None
See application file for complete search history.

(56) References Cited

U.S. PATENT DOCUMENTS

| | | | |
|---|---|---|---|
| 3,723,163 | A | 3/1973 | Schumacher |
| 4,539,345 | A | 9/1985 | Hansen |
| 4,788,270 | A | 11/1988 | Anderson et al. |
| 5,225,512 | A | 7/1993 | Baghdachi et al. |
| 5,373,050 | A | 12/1994 | Morikawa et al. |
| 6,001,946 | A | 12/1999 | Waldman et al. |
| 6,706,789 | B2 | 3/2004 | Ddamulira et al. |
| 6,881,775 | B2 | 4/2005 | Ddamulira et al. |
| 7,041,374 | B1 | 5/2006 | Nelson et al. |
| 7,820,754 | B2 | 10/2010 | Betremieux et al. |
| 8,980,377 | B1 | 3/2015 | Stefanescu et al. |
| 9,068,103 | B2 | 6/2015 | Dickens |
| 9,175,187 | B2 | 11/2015 | Killilea |
| 2002/0022688 | A1 | 2/2002 | Tysak |
| 2003/0224195 | A1 | 12/2003 | Tysak |
| 2005/0137323 | A1 | 6/2005 | Roesler et al. |
| 2005/0166797 | A1 | 8/2005 | Li et al. |
| 2006/0124225 | A1 | 6/2006 | Wu et al. |
| 2006/0270770 | A1 | 11/2006 | Feng et al. |
| 2008/0057316 | A1 | 3/2008 | Landon et al. |
| 2008/0146695 | A1 | 6/2008 | Nefzger et al. |
| 2009/0004468 | A1 | 1/2009 | Chen et al. |
| 2009/0299017 | A1 | 12/2009 | Tsuno et al. |
| 2012/0183789 | A1 | 7/2012 | Smith |
| 2013/0202970 | A1 | 8/2013 | Lu et al. |
| 2013/0303690 | A1 | 11/2013 | Varkey et al. |
| 2014/0350175 | A1* | 11/2014 | Dinkar ................. C08G 65/336 524/588 |
| 2014/0357790 | A1 | 12/2014 | Dickens |
| 2015/0011695 | A1 | 1/2015 | Bohling |
| 2016/0160101 | A1 | 6/2016 | Dickens |

FOREIGN PATENT DOCUMENTS

| | | | |
|---|---|---|---|
| CA | 2753125 | A1 | 9/2010 |
| DE | 19929011 | A1 | 12/2000 |
| EP | 0601021 | A1 | 8/1992 |
| EP | 1697436 | B1 | 12/2004 |
| WO | WO1993005089 | A1 | 3/1993 |
| WO | WO2013116625 | A1 | 8/2013 |

OTHER PUBLICATIONS

Product Information Sheet for TS-720, CAB-O-SIL, Apr. 2004, pp. 1-2.
http://msdssearch.dow.com/PublishedLiteratureDOWCOM/dh_08ea/0901b803808eae0f.pdf?filepath=coatings/pdfs/noreg/884-00209.pdf&fromPage=GetDoc., Mar. 2013.
Properties of Pyrograf III Carbon Nanofibers Aug. 22, 2012. pp. 1-6.
3M Fluorad Fluorosurfactant FC-4430 Product Information; 3m Specialty Materials, 3M Center, Building 223-6S-04, St. Paul, MN 55144-1000; Issued Mar. 2002.
Advanced Adhesive Technologies, Inc. AAT-725 Sport Floor & Resilient Adhesive. https://aatglue.com/AAT-725-Sport-Floor-Resilient-Adhesive-1.html.

* cited by examiner

*Primary Examiner* — Robert T Butcher

(57) ABSTRACT

Pressure sensitive and waterproof urethane-based adhesive compositions and methods of preparing said compositions. A silane is added to a prepolymer urethane to react with the urethane and at least partially end-cap the urethane. A reinforcing extender and a thixotropic agent are added to the composition. Methylethylketoximino (MEKO) silane is further added to the composition. When applied to a substrate, the adhesive composition has a tack-free time of at least about 90-120 minutes. The adhesive is cured to a final product that is waterproof, hydrolytically stable, and pH resistant.

9 Claims, 4 Drawing Sheets

PRESSURE SENSITIVE, WATERPROOF ADHESIVE COMPOSITIONS

CROSS REFERENCE

This application is a continuation-in-part and claims benefit of U.S. patent application Ser. No. 15/043,075, filed Feb. 12, 2016, which is a continuation-in-part and claims benefit of U.S. patent application Ser. No. 14/376,112, filed Jul. 31, 2014, which is a 371 of PCT/US13/24314, filed Feb. 1, 2013, which claims benefit of U.S. patent application Ser. No. 13/365,850, filed Feb. 3, 2012, which is a non-provisional of U.S. Provisional Patent Application No. 61/439,271, filed Feb. 3, 2011, the specification(s) of which is/are incorporated herein in their entirety by reference.

FIELD OF THE INVENTION

The present invention is directed to a waterproof adhesive, e.g., a formulated silane end-capped adhesive, having pressure sensitive properties. The adhesive may be used, for example, to form a chemical bond between flooring materials and concrete substrates.

BACKGROUND OF THE INVENTION

Concrete is a common and popular composite material used for constructing structures. It is used to make roads, buildings, walls, and floors. Concrete may be composed of water, granular solids, and binders, along with other materials, that are mixed together to form a highly viscous fluid that cures and dries into a hard, rigid mass. When used in flooring applications, i.e. building foundations, a flooring material may be applied onto the concrete surface. Some examples of flooring material are chemical finishes, wood, tile, and flooring covers such as carpet and vinyl.

Adhesives are used in a number of applications for holding, protecting, and sealing purposes. In the flooring industry, adhesives are used to bond flooring materials to rigid substrates, such as concrete. During the early part of the 1990s, the flooring industry moved from solvent-born adhesives to aqueous or water-born formulations. Subsequently, it became evident that the water-born formulations were sensitive to elevated concrete moisture and pH. The current standard industry practice to combat the issue of pH catalyzed moisture degradation is to apply a moisture barrier coating with near zero permeability to the concrete surface in order to negate the effects of alkaline moisture attack and protect installation adhesives from failure. Application of said coating can be expensive, difficult, and time-consuming. In cases where floors are subjected to elevated moisture from maintenance, flooding, or relatively high humidity, the failure of these water-born formulations can lead to extensive and costly repairs. Hence, there is a need for adhesives that exhibit alkaline and waterproof properties in order to mitigate the problems caused by high moisture and alkalinity.

Pressure sensitive adhesives (PSAs) are one type of adhesive that can bond two substrates together by surface contact using pressure applied upon at least one of the substrates. These adhesives require no activation with water, solvent or heat, and firmly adhere to many dissimilar surfaces with minimal pressure. Typical PSAs do not solidify to form a solid material, but remain viscous and permanently tacky. Since these adhesives are not true solids, the strength of pressure sensitive adhesives decreases when the temperature is increased. As shown in FIG. 4, PSAs are typically formulated from natural rubber, synthetic rubbers such as styrene/butadiene copolymers (SBR) and styrene/isoprene/styrene (SIS) block copolymers, polyacrylates such as acrylates and methacrylates, and silicone.

Each PSA material can have its own advantages and disadvantages. Disadvantages of rubber-based adhesives include limited effectiveness when exposed to certain chemicals, UV rays, or high temperatures (over 150° F./66° C.). In addition, they are more susceptible to oxidation and may darken, lose their tack, and become brittle if overexposed. Also, rubber/resin adhesives may turn soft and gummy if plasticizers, used in most polyvinyl chloride films (PVC), migrate into the adhesive. Disadvantages of acrylics usually include poor adhesion to low-energy surfaces, such as polyethylene and polypropylene, as well as lower overall adhesion compared to rubber unless the adhesive is highly engineered. Acrylic adhesives are also sensitive to elevated pH and when exposed readily hydrolyze losing the adhesive properties. Silicone-based adhesives can maintain adhesion over a range of temperatures; however, beyond their ability to adhere to difficult surfaces, their overall adhesive strength is low. Hence, there is a need for improved pressure sensitive adhesives.

The present invention features a novel adhesive material that possess alkaline and waterproof properties in order to mitigate the problems caused by high moisture and alkalinity, as well as exhibiting pressure sensitive properties. In some embodiments, the present invention may be used in flooring applications to provide for a strong, durable and permanent adhesion that allows for facile installation of flooring materials.

SUMMARY

It is an objective of the present invention to provide for a pressure sensitive, waterproof urethane-based adhesive. Embodiments of the invention are given in the dependent claims. Embodiments of the present invention can be freely combined with each other if they are not mutually exclusive.

In one embodiment, the present invention features a waterproof adhesive composition comprising a cured mixture comprising a urethane component, a first silane component, a second silane component comprising a methylethylketoximino (MEKO) silane, a reinforcing extender, and a thixotropic agent. Preferably, the adhesive composition is waterproof, hydrolytically stable, and pH-resistant.

In another embodiment, the present invention features a method of producing a curable pressure sensitive, waterproof adhesive mixture. The method providing a urethane component, providing a first silane component, providing a reinforcing extender, providing a thixotropic agent, mixing the urethane component, the first silane component, the reinforcing extender, and the thixotropic agent to form a dispersion, adding a second silane component comprising a methylethylketoximino (MEKO) silane to the dispersion, and mixing the second silane component and the dispersion to form the adhesive mixture. Without wishing to limit the invention to a particular theory or mechanism, the method can be effective for producing the adhesive mixture that, when applied to substrate, has a tack-free time of at least about 90 minutes. Further still, the adhesive mixture can be waterproof, hydrolytically stable, and pH-resistant.

One of the unique inventive technical features of the present invention is that the use of methylethylketoxime (MEKO) silanes in the present adhesive composition surprisingly resulted in a sigmoidal cure curve with a lag phase spanning about 90 minutes, as shown in FIG. 1. This delayed cure transition is unlike the typical urethane adhesives that follow a more linear rate of cure at least during the 1st hour of application. Without wishing to limit the invention to any theory or mechanism, it is believed that the technical feature of the present invention advantageously suppresses the cure rate of the adhesive, i.e. solidification of the adhesive, thereby allowing more time for a user to properly install the flooring material while the adhesive is still wet or tacky during this lag phase. The cure rate of the adhesive then surprisingly increases after this lag phase, and transitions to a more conventional urethane curative state. None of the presently known prior references or work has the unique inventive technical feature of the present invention. Further still, one of ordinary skill in the art cannot predict that the adhesive composition of the present invention would yield the aforementioned features.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1:
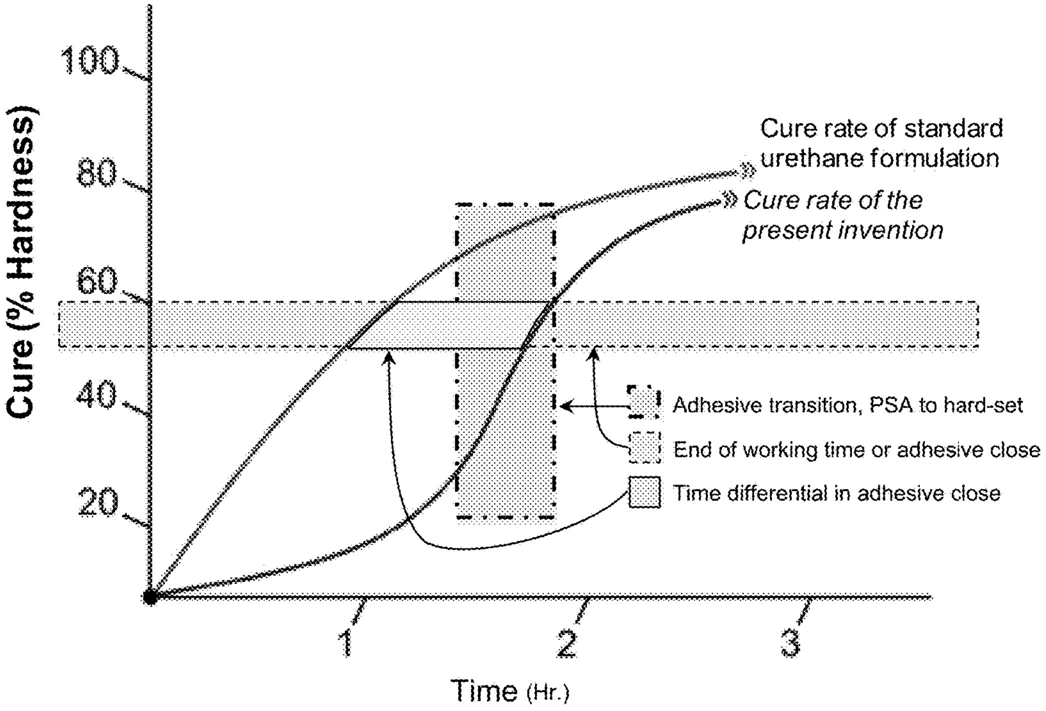
FIG. 1 shows adhesive curing as a function of time for a standard urethane formulation and the formulation of the present invention.
Figure 2:
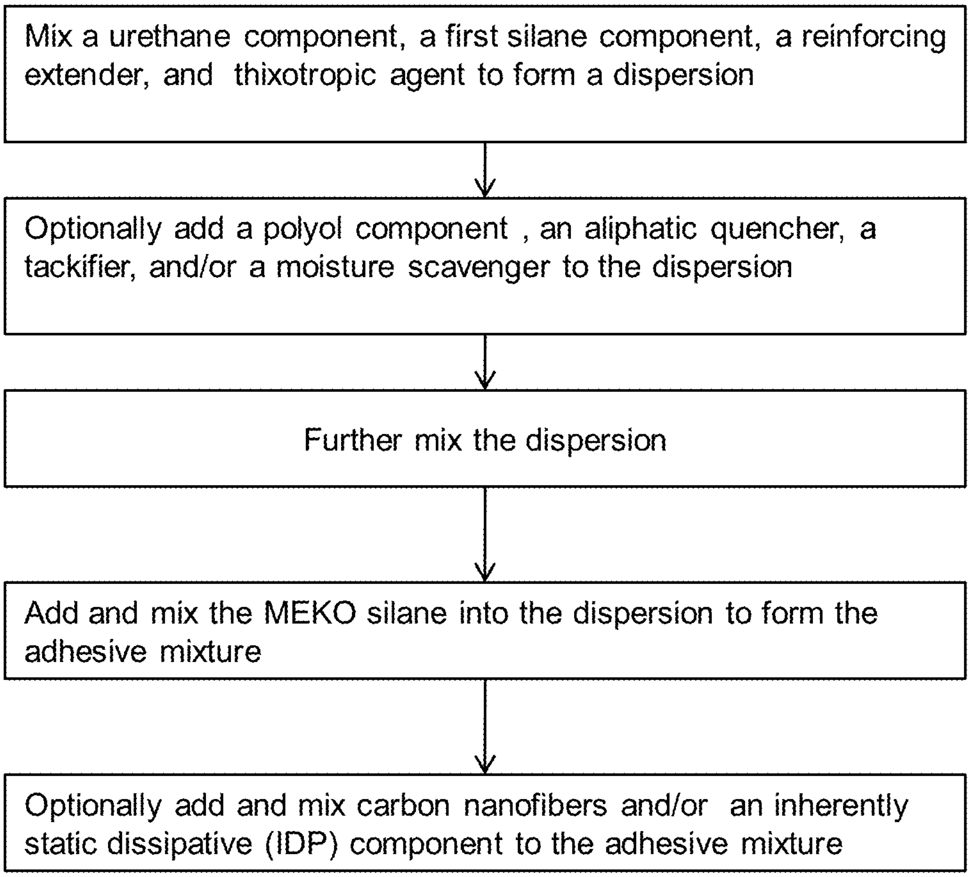
FIG. 2 shows a non-limiting schematic of preparing an adhesive of the present invention.
Figure 3:
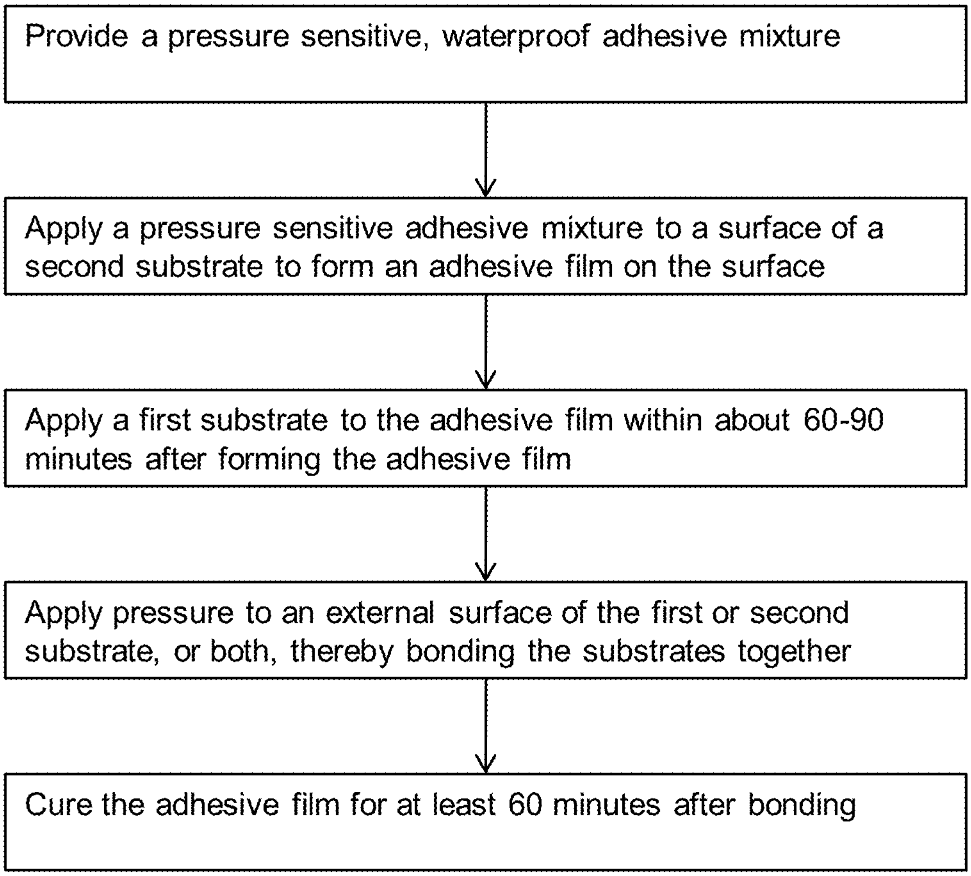
FIG. 3 shows a non-limiting schematic of using an adhesive of the present invention to bond substrates.
Figure 4:
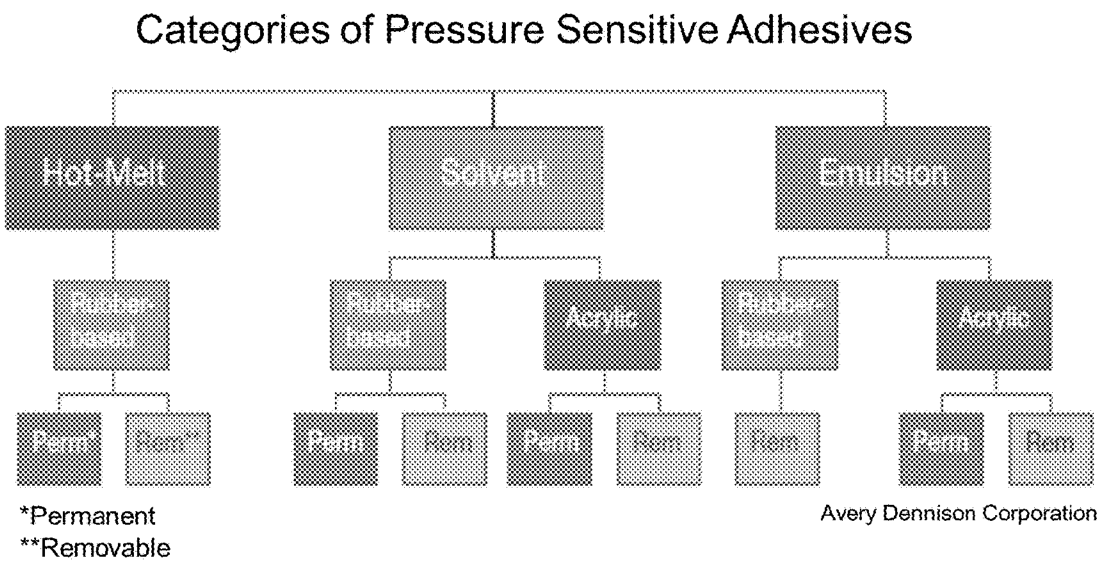
FIG. 4 shows the various types of commercial pressure sensitive adhesives.

Before the present invention is disclosed and described, it is to be understood that this invention is not limited to specific compositions, systems and methods, and as such may, of course, vary. It is also to be understood that the terminology used herein is for the purpose of describing particular embodiments only and is not intended to be limiting.

As used herein, the term "tack-free" is defined not being sticky. A material is said to be tack-free when it attains a sufficiently robust state to resist damage by contact or handling. This is a critical point to any cure, and the time to reach this point is an important control parameter. For open systems, such as sealants, coatings or free-rise foams, this is the tack-free time, defines as the period from the start of cure to a point when the material is sufficiently robust to resist damage by touch or settling dirt. In ad hoc testing, tack-free time can be determined as the point when the surface no longer feels sticky. In a more structured way, it can be determined by briefly pressing a polyethylene film against the surface and checking for any adhering material when the film is removed. A small metal weight, to provide a reproducible contact pressure, is commonly used in this test. Preferably, the adhesive material of the invention becomes tack-free in a period of about 90-120 minutes after application to the surface.

For proper bonding of concrete overlays and coatings, the surface should be given a correct concrete surface profile, or CSP. As known to one of ordinary skill in the art, the International Concrete Repair Institute has developed benchmark guidelines for CSP-a measure of the average distance from the peaks of the surface to the valleys. The CSP level can range from CSP 1 (nearly flat) to CSP 9 (very rough).

Concrete is plastic-like in a freshly mixed state and subsequently becomes hard, with considerable strength. This change in its physical properties is due to the chemical reaction between cement and water, a process known as hydration. Hydration involves chemical changes, not just a drying out of the material. The reaction is gradual, first causing stiffening of the concrete, and then development of strength, which continues for a very long time. The hardening process is not dependant on the concrete 'drying out', and it is normally important that the concrete is properly 'cured' to maintain the moisture in the concrete while the cement water reaction is active. As known to one of ordinary skill in the art, the term "hardened" when used in conjunction with a concrete substrate refers to the concrete substrate reaching a final set such that it has completely lost its plasticity and attained sufficient firmness to resist certain definite pressures. For example, a person can stand, or an object can be placed, on the hardened concrete substrate without leaving indentations on the surface of the concrete substrate. As defined in the American Concrete Institute (ACI) Manual of Concrete Practice, ACI 116R, "final set" is an empirical value indicating the time in hours and minutes required for the cement paste to stiffen sufficiently to resist to an established degree, for example, the penetration of a weighted test needle.

As used herein, alkali-resistance is defined as the ability to resist reactions with alkaline (pH>7) materials such as lime, cement, plaster, etc. As use herein, pH-resistance is defined as the ability to resists changes in pH.

As used herein, the term "waterproof" is defined as being impenetrable by water. This should not be confused or interchanged with the term "water-resistant", which is defined as being penetrated by water over time and under high pressures. As used herein, the term "hydrolytically stable" is defined as resisting chemical decomposition in the presence of water.

As used herein, the terms "polymeric matrix adhesive", "polymeric matrix adhesive composition", "adhesive composition" and "adhesive mixture" can be used interchangeably, unless otherwise specified.

As used herein, the term "alkyl" refers to a monovalent group that is a radical of an alkane, and having about 1 to 20 carbon atoms. The alkyl can be linear, branched, cyclic, or combinations. Examples of alkyl groups include, but are not limited to, methyl, ethyl, propyl, butyl, pentyl, hexyl, heptyl, octyl, etc.

As used herein, the term "alkene" refers an unsaturated, aliphatic hydrocarbon group with one or more carbon-carbon double bonds. Examples of alkene groups include, but are not limited to, vinyls, allyls, isoprene, butenes, and hexenes.

As used herein, the term "aryl" refers to any functional group or substituent derived from an aromatic ring, usually an aromatic hydrocarbon. Examples of aryls groups include, but are not limited to, phenyls, tolyl, xylyl, and naphtyls.

Polyurethane prepolymers may be formed by combining an excess of diisocyanate with polyol. One of the NCO groups of the diisocyanate reacts with one of the OH groups of the polyol. The other end of the polyol reacts with another diisocyanate. The resulting prepolymer has an isocyanate group on both ends. The prepolymer is a diisocyanate itself, and it reacts like a diisocyanate but with several important differences. When compared with the original diisocyanate, the prepolymer has a greater molecular weight, a higher viscosity, a lower isocyanate content by weight (% NCO), and a lower vapor pressure. Instead of a diol, a triol or higher functional polyol could also be used for the polyol in the reaction. Molar ratios of diisocyanate to polyol greater than 2:1 can also be used. These are called quasi-prepolymers.

As used herein, a slow-cure urethane prepolymer is polyisocyantate prepolymer based on diphenylmethane diisocyanate (MDI). High functionality (Fn) and NCO content gives increased reactivity to this component. On its own this prepolymer will form highly rigid films and must be modified for proper application requirements. As used herein, a flexible binder urethane prepolymer is polyisocyanate prepolymer based on diphenylmethane diisocyanate (MDI). Lower functionality and NCO content makes this prepolymer less reactive and slower curing. Higher equivalent weight gives this component additional flexibility and gap bridging properties. Tables 1-3 provide standards for the slow-cure urethane prepolymer and the flexible binder urethane prepolymer. A single slow-cure urethane prepolymer possessing properties similar to the mixture of the two components could be used. Equivalents or substitutes are within the scope of the present invention.

TABLE 1

| Urethane Prepolymer | Fn | Sp Gravity @ 25° C. | % NCO | Eq Wt | Viscosity cps @ 25° C. |
|---|---|---|---|---|---|
| Slow-cure urethane prepolymer | 2.54 | 1.12 | 15.8 | 266 | 3400 |
| Flexible binder urethane prepolymer | 2.00 | 1.10 | 9.7 | 433 | 2000 |

TABLE 2

SLOW-CURE URETHANE PREPOLYMER SPECIFICATIONS

| Property | Value |
|---|---|
| NCO content, % | 15.0-23.0 |
| Viscosity @ 25 C., cps | 3000-8000 |
| Appearance | Brown liquid |
| Eq wt | 250-270 |
| Fn | 2.5-2.55 |

TABLE 3

FLEXIBLE BINDER URETHANE SPECIFICATIONS

| Property | Value |
|---|---|
| NCO content, % | 2.0-10.0 |
| Viscosity @ 25 C., cps | 1500-3500 |
| Appearance | Clear liquid |
| Eq wt | 425-550 |
| Fn | 2.00 |

In one embodiment, a silane is used to react with the urethane prepolymers to form a silane end-capped polymer, i.e. a silane end-capped polyurethane. Non-limiting examples of silanes include alkoxysilanes such as amino-functional alkoxysilanes, gamma-aminopropyltrimethoxysilane, benzylamino, chloropropyl, epoxy, epoxy/melamine, ureido, vinyl-benzyl-amino, the like, or a combination thereof. The alkoxysilane is not limited to the aforementioned examples.

In another embodiment, the urethane prepolymer may be substituted with a polycarboxylate (e.g., to create a silane end-capped polycarboxylate). In another embodiment, the flexible binder urethane prepolymer or the slow-cure urethane prepolymer may be substituted or mixed in with a tackifier. Examples of tackifiers include, but are not limited to, polyether polyol, carboxylic diols, and alkoxy-functionalized silicone polymers such as polydimethyl siloxane. For illustrative purposes, the tackifier may be a high molecular weight (e.g., greater than about 4,000 g/mol) polyether polyol. The polyether polyol may help increase adhesive flexibility. For example, the polyether polyol increases elongation and flexible adhesion yet maintains formulation stability. The polyether polyol may help provide a dry film suitable for use with flooring substrates that demonstrate dimensional properties of expansion and contraction. A softer or more flexible product may also function as a sound abatement system (e.g., for wood flooring installations). A softer or more flexible product may also produce an adhesive bond line that holds carpet tile firmly yet allows removal via peeling the floor back (e.g., at a severe angle) creating cohesive failure of the adhesive. Table 4 describes a non-limiting example of properties of a polyether polyol.

TABLE 4

TYPICAL PROPERTIES OF POLYETHER POLYOL

| Property | Value |
|---|---|
| Appearance | Clear viscous liquid |
| Specific Gravity at 20° C. | 1.01 |
| Viscosity at 25° C., cps | 980 |
| Flash Point, PMCC, ° C. | 213 |
| Bulk Density, lb/gal | 8.38 |

Hydrophobic modification is the treatment of a substrate's surface so that it becomes non-polar. A surface can be polar because of the hydrogen bonding locations. By eliminating or reducing the hydrogen bonding at the surface, the surface is shielded from interacting with water molecules and is therefore rendered hydrophobic. For calcium carbonate, it is theorized that although calcium carbonates do not form stable bonds with silicates, the low molecular weight and low surface energy of the silicates allow for the silicates to penetrate porous structures and encapsulate the substrate in a silica-rich network.

In some embodiments, the hydrophobically modified reinforcing extender may contribute to the overall waterproof quality of the cured, waterproof polymeric matrix adhesive. In other embodiments, the hydrophobically modified reinforcing extender provides an increase in mechanical strength, provides dimensional stability, build viscosity, reduce shrinkage, and reduce cracking in the adhesive. For example, a reinforcing extender, such as a mineral component can be hydrophobically modified by adding a silane or aliphatic silane. Examples of mineral components include, but are not limited to, calcium carbonate, limestone, layered clays, aluminates, hydrotalcite and the like. Illustrative of a hydrophobically modified reinforcing extender is a hydrophobically modified calcium carbonate.

A thixotropic agent can function as a thickener and/or to build viscosity. Preferably, the thixotropic agent is hydrophobically modified. In some embodiments, the following may be used as thixotropic agents: fumed silica, hydrogenated castor oil derivatives, hydrophobically modified cellulosic materials, surface modifiers based on polyethylene, polypropylene and PTFE technologies, hydrated magnesium aluminosilicate and the like.

In some embodiments, an aliphatic quenching agent can terminate chemical reactions such that the adhesive formulation has minimal to no reactivity (i.e. inert). A non-limiting example of the aliphatic quenching agent is an aliphatic fatty acid ester mixture. The aliphatic fatty acid ester mixture is a UV stable, zero VOC solvent having low viscosity, possessing high flash point and low volatility. This solvent readily biodegrades in the environment (>90% in 28 days). This solvent is not derived from petroleum distillates, is non-toxic, non-hazardous under RCRA, non-HAPS and meets clean air solvent certification. Aliphatic Fatty Acid Ester Mixture is sold under various trade names, for example: Solvation (Shepard Bros, La Habra, Calif.) and Promethean ME (Promethean Biofuels, Temecula, Calif.). In some embodiments, the following agents may be used as aliphatic fatty acid esters: fatty acid methyl esters (FAME) such as myristic acid, palmitic acid, palmitoleic acid, stearic acid, oleic acid, linoleic acid, eicosanoic acid, docosenoic acid and the like, which are molecules in biodiesel derived from the transesterification of vegetable oils and the like.

Further non-exhaustive examples of quenching agents include mixtures of aliphatic hydrocarbons of various molecular weights and fractionation containing alkanes, alkenes and alkynes derived, but not exclusively, from petroleum sources. Mixtures may also contain natural hydrocarbons from biological sources such as terpenes and isoprene and the like. These mixtures exhibit partial solubility of the urethane formulation components. The following tables are non-limiting examples of properties of quenching agents. Equivalents or substitutes are within the scope of the present invention.

TABLE 5.1

| Petroleum Distillates | |
|---|---|
| Molecular Weight: | approximately 87-114 |
| Odor: | pleasant aromatic odor |
| Boiling Range: | 95-160° C. |
| Specific Gravity: | 0.7275-0.7603 |
| Color: | clear, water white to yellow |
| Vapor Pressure: | 2-20 mm Hg at 20° C. |
| Flashpoint: | −6.7 to 12.8° C. (closed cup) |
| Synonyms: | benzene, naphtha 76, ligroin, high boiling petroleum ether |
| Molecular Species: | $C_7$-$C_{11}$ |

TABLE 5.2

| Terpenes and Isoprene | |
|---|---|
| Molecular Weight: | $C_5H_8$ |
| Molar Mass: | 68.12 g/mol |
| Density: | 0.681 g/cm$^3$ |
| Melting Point: | −143.95° C. |
| Boiling Point: | 34.067° C. |

TABLE 5.3

| Stoddard Solvent | |
|---|---|
| Molecular Weight: | approximately 135-145 |
| Odor: | kerosene-like |
| Boiling Range: | 160-210° C. |
| Specific Gravity: | 0.75-0.80 |
| Color: | colorless |
| Vapor Pressure: | 4-4.5 mm Hg at 25° C. |
| Flashpoint: | 37.8° C. (closed cup) |
| Synonyms: | 140 flash solvent, odorless solvent and low end point solvent |
| Molecular Species: | $C_9$-$C_{11}$ |

TABLE 5.4

| Mineral spirits | |
|---|---|
| Molecular Weight: | approximately 144-169 |
| Odor: | pleasant sweet odor |
| Boiling Range: | 150-200° C. |
| Specific Gravity: | 0.77-0.81 |
| Color: | clear, water white |
| Vapor Pressure: | 0.8 mm (Hg) at 20° C. |
| Flashpoint: | 30.2-40.5° C. (closed cup) |
| Synonyms: | white spirits, petroleum spirits, and light petrol |
| Molecular Species: | $C_9$-$C_{12}$ |

In other embodiments, a catalyst is used to accelerate chemical reactions and promote curing of the adhesive. The catalyst is preferably an aliphatic metal catalyst such as dibutyltindilaurate. The percent weight of the aliphatic metal catalyst is about 0.001 to 5% (e.g., 0.1%). Other examples of the aliphatic metal catalyst include, but are not limited to, organometallic compounds based on mercury, lead, tin, bismuth, zinc, the like, or a combination thereof.

In further embodiments, a moisture scavenger may be used to limit the amount of moisture contamination absorbed from the atmosphere. In one embodiment, the moisture scavenger comprises vinyl-functionalized methoxy silane, such as vinyltrimethoxysilane.

In yet other embodiments, adhesion promoters may be used as cross-linking agents to improve adhesion between inorganic fillers, basic materials and resins. Examples of adhesion promoters include, but are not limited to, silane based crosslinkers such as oximesilane crosslinkers, alkyl-functionalized silane crosslinkers, aminosilane crosslinkers, and alkoxysilane crosslinkers such as glycidoxypropyltrimethoxysilane. For example, glycidoxypropyltrimethoxysilane is an epoxy substituted alkoxysilane used as a cross-linking agent and adhesion promoter. Glycidoxypropyltrimethoxysilane finds unsaturated sites and reacts to provide potential excess silane to increase the likelihood of the silanol-bridge bonding mechanism between the adhesive and the substrate improving mechanical strength.

As another example, the crosslinkers may be oxime-silane based crosslinkers such as methylethylketoximino (MEKO) silanes. Non-limiting examples of MEKO silanes include methyl tris(MEKO)silane, phenyl tris(MEKO)silane, vinyl tris(MEKO)silane, tetrakis(MEKO)silane, and dimethyl bis (MEKO)silane. Table 6 shows exemplary properties of MEKO silanes. Equivalents or substitutes are within the scope of the present invention.

Oxime silane-based crosslinkers allow for neutral moisture-cure. Using these silane compounds, 2-butanone oxime or MEKO is released, but no acetic acid or amine is released unlike in acid or alkaline crosslinking systems. Without wishing to limit the invention to a particular theory or mechanism, it is believed that MEKO functions by binding drying agents and metal salts that catalyze the oxidative crosslinking of the adhesive mixture. Once the adhesive mixture has an hour or so to dwell on the concrete surface, MEKO evaporates, thereby further allowing the crosslink reaction to proceed.

TABLE 6

| MEKO SILANE CROSSLINKERS | |
|---|---|
| Property | Value |
| Density at 20° C. | 0.94-0.995 g/cm$^3$ |
| Refractive Index at 20° C. | 1.45-1.483 |
| Appearance | Transparent clear liquid |
| Color | Colorless to yellowish |

In still other embodiments, additional tackifiers may be used to plasticize the adhesive and/or reduces moisture sensitivity and/or enhances flexibility and adhesion to low energy flooring substrate. In some embodiments, the tackifier is the methyl ester of rosin. Below is a non-limiting example of a tackifier (Table 7). Equivalents or substitutes are within the scope of the present invention.

Methyl Ester of Rosin has a resinous nature, clarity, high refractive index, low vapour pressure, high boiling point, and good thermal stability. It has excellent surface wetting properties and is compatible and miscible with a wide variety of materials. It is soluble in esters, ketones, alcohols, ethers, coal tar, petroleum hydrocarbons, and vegetable and mineral oils. It is insoluble in water. It is compatible at all ratios, or in limited but practically useful proportions, with nitrocellulose, ethylcellulose, chlorinated rubber, and most other film-formers; with water-soluble film-formers such as starch, casein, and glue; with natural and synthetic rubbers, natural and synthetic resins, waxes, and asphalt. It is incompatible with cellulose acetate and polyvinyl acetate. These physical properties, plus its wide compatibility, make it useful in a variety of applications, including lacquers, inks, paper coatings, varnishes, adhesives, sealing compounds, plastics, wood preservatives and perfumes. To assure minimum odour of products in which it is used, it is given a special steam sparging treatment. Methyl ester of rosin is used in lacquers to contribute high gloss, clarity, and fullness; as a plasticizing resin in pressure-sensitive and hot-melt adhesives for superior adhesion, resistance to sweating or exudation, and reduced moisture sensitivity; as a fixative and carrier in perfumes and cosmetic preparations for its low vapour pressure, neutral character, pleasant odour, and high co-solvent action; for various combinations of these and other properties in inks, varnishes, and asphalts; as a replacement for castor oil; as a rubber softener; and in many similar applications. Methyl ester of rosin is sold under various trade names, for example: Abalyn (Eastman Chemical BV, The Netherlands)

TABLE 7

| METHYL ESTER OF ROSIN | |
|---|---|
| Property | Value |
| Density at 25° C. | 1.04 kg/dm$^3$ |
| Water Solubility | Insoluble |
| Viscosity at 25° C. | 3000-6000 mPa. s |
| Flash Point | 170° C. |
| Refractive Index at 20° C. | 1.530 |

In one embodiment, a waterproof adhesive composition may comprise a blend of prepolymer (e.g., urethane prepolymer) that is modified with a silane, e.g., a trimethoxy substituted amino functional silane, in the manufacturing process (e.g., in situ). In some embodiments, a mixture of naturally derived aliphatic fatty acid ester is used as a diluent/compatibilizer that assists in the incorporation of hydrophobically-treated calcium carbonates and hydrophobically-treated fumed silica viscosifiers. Final adhesive formulation viscosity may be adjusted to provide trowelability and overall aesthetic.

The adhesive can undergo a silanol-bridge mechanism to form waterproof chemical bonds, i.e. urethane and silanol condensation bonds, to the concrete surface primed with the degassing primer and to the flooring material. In some embodiments, the adhesive bond that is formed is alkali stable to pH 14. Evaluation of concrete moisture according to ASTM F1869 may exceed 15 lbs/1000 sf/24 hrs and according to ASTM F2170 to 100% RH. Generally, the silanol condensation reaction is waterproof, solvent proof, and heat resistant. The cured adhesive creates a hydrophobic barrier to liquid water, yet allows water vapor to move through the concrete/primer/adhesive/flooring matrix.

Adhesive Compositions

According to one embodiment, the present invention features a waterproof adhesive composition comprising a cured mixture comprising a urethane component, a first silane component, a second silane component comprising a methylethylketoximino (MEKO) silane, a reinforcing extender, and a thixotropic agent. Preferably, the adhesive composition is waterproof, hydrolytically stable, and pH-resistant.

In one embodiment, the MEKO silane may be according to the formula:

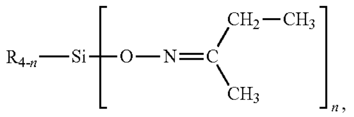

where n ranges from 1 to 4, and R is an alkyl, an alkene, or aryl group. In some embodiments, the MEKO silane may comprise a methyl tris(MEKO)silane, a phenyl tris(MEKO) silane, a vinyl tris(MEKO)silane, a tetrakis(MEKO)silane, a dimethyl bis(MEKO)silane, or a combination thereof. In other embodiments, the second silane component is at a range of about 2-10 wt % of the composition.

In one embodiment, the urethane component can range from about 30-50 wt % of the mixture. In another embodiment, the urethane component can have an average NCO content of about 7 to 23%. In some embodiments, the urethane component may comprise at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%.

In some embodiments, the first silane component may be an amino-functional alkoxysilane polymer having terminal silanol groups. In other embodiments, the first silane component is at a range of about 2-10 wt % of the mixture. In still other embodiments, the reinforcing extender is at a range of about 2-10 wt % of the mixture. In further other embodiments, the thixotropic agent is at a range of about 2-10 wt % of the mixture.

In one embodiment, the cured mixture may further comprise about 15-40 wt % of a polyol component having an average molecular weight of at least about 4,000 g/mol. In another embodiment, the cured mixture may further comprise about 5-15 wt % of an aliphatic quencher. In a further embodiment, the cured mixture may further comprise about 2-10 wt % of a tackifier.

In one embodiment, the cured mixture may further comprise carbon nanofibers. The carbon nanofibers may be effective for increasing electrical conductivity of the adhesive composition. In some embodiments, each carbon nanofiber can have a fiber diameter of about 120 to 160 nm, and a dispersive surface energy of about 120 to 140 $mJ/m^2$. Without wishing to limit the invention to a particular theory or mechanism, the carbon nanofibers can provide enhanced electrical conductivity over a broad range along with mechanical reinforcement of the adhesive. Other benefits provided by the carbon nanofibers include improved heat distortion temperatures and increased electromagnetic shielding.

In another embodiment, the cured mixture may further comprise an inherently static dissipative (IDP) component effective for decreasing surface resistance of the adhesive composition. Other benefits of the IDP component include the ability to ground potentially hazardous charges. The IDP component can have a surface resistivity of about $1^{07}$ to $1^{10}$ Ω/sq. Non-limiting examples of the IDP component include polypropylene, polystyrene, polyethylene, and acrylic polymers.

According to one embodiment, the present invention features a curable pressure sensitive, waterproof adhesive mixture comprising a urethane component, a first silane component, a second silane component comprising a methylethylketoximino (MEKO) silane, a reinforcing extender, and a thixotropic agent. Preferably, when the adhesive mixture is applied to a substrate, the adhesive mixture has a tack-free time of at least about 90 minutes. More preferably, the adhesive mixture is waterproof, hydrolytically stable, and pH-resistant.

In some embodiments, the MEKO silane may be according to the formula:

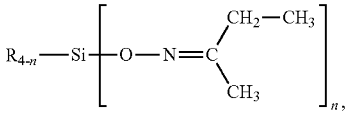

where n ranges from 1 to 4, and R is an alkyl, an alkene, or aryl group. The MEKO silane may comprise a methyl tris(MEKO)silane, a phenyl tris(MEKO)silane, a vinyl tris (MEKO)silane, a tetrakis(MEKO)silane, a dimethyl bis (MEKO)silane, or a combination thereof. In other embodiments, the second silane component is at a range of about 2-10 wt % of the adhesive mixture.

In other embodiments, the urethane component can range from about 30-50 wt % of the adhesive mixture. In another embodiment, the urethane component can have an average NCO content of about 7 to 23%. In one embodiment, the urethane component may comprise at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%.

In one embodiment, the first silane component may be an amino-functional alkoxysilane polymer having terminal silanol groups. In another embodiment, the first silane component is at a range of about 2-10 wt % of the adhesive mixture. In yet another embodiment, the reinforcing extender is at a range of about 2-10 wt % of the adhesive mixture. In a further embodiment, the thixotropic agent is at a range of about 2-10 wt % of the adhesive mixture.

In some embodiments, the adhesive mixture may further comprise about 15-40 wt % of a polyol component having an average molecular weight of at least about 4,000 g/mol. In other embodiments, the adhesive mixture may further comprise about 5-15 wt % of an aliphatic quencher. In still other embodiments, the adhesive mixture may further comprise about 2-10 wt % of a tackifier.

In some embodiments, the adhesive mixture may further comprise carbon nanofibers effective for increasing electrical conductivity of the adhesive composition. Each carbon nanofiber can have a fiber diameter of about 120 to 160 nm, and a dispersive surface energy of about 120 to 140 $mJ/m^2$.

In other embodiments, the adhesive mixture may further comprise an inherently static dissipative (IDP) component effective for decreasing surface resistance of the adhesive composition. Examples of the IDP component include, but are not limited to, polypropylene, polystyrene, polyethylene, and acrylic polymers. Adhesive mixtures having the carbon fibers and IDP component would be suitable for use in electronics manufacturing clean rooms.

Table 8 describes a non-limiting example of a pressure sensitive adhesive composition.

| Component | Percent weight |
|---|---|
| Urethane prepolymer | 30-50 |
| Polyol (4000 MW) | 20-40 |
| Amino-functional alkoxysilane | 2-5 |
| Quenching agent | 5-15 |
| Tackifier | 3-10 |
| Oxime silane | 3-10 |
| Reinforcing extender | 3-10 |
| Thixotropic agent | 3-10 |
| Catalyst (e.g. aliphatic metal) | 0.01-1 |
| Pigment | 0.01-1 |

Table 9 describes another non-limiting example of a pressure sensitive adhesive composition.

| Component | Percent weight |
|---|---|
| Urethane prepolymer | 30-50 |
| Polypropylene glycol | 20-40 |
| Amino-functional alkoxysilane | 2-5 |
| aliphatic methyl-ester | 5-15 |
| methyl ester rosin | 3-10 |
| MEKO silane | 3-10 |
| Reinforcing extender | 3-10 |
| Thixotropic agent | 3-10 |
| Vinyltrimethoxysilane | 0.005-0.015 |
| Dibutyltindilaurate | 0.01-1 |
| Pigment | 0.01-1 |

Table 10 describes an exemplary adhesive composition, referred to as the LVT adhesive.

| Component | Percent weight |
|---|---|
| Slow-cure urethane prepolymer | 55-65 |
| Flexible binder urethane prepolymer | 15-30 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |

-continued

| Component | Percent weight |
|---|---|
| Thixotropic agent | 1-5 |
| Methyl ester of rosin | 0.5-1.5 |
| Pigment | 0.005-0.015 |

Alternatively, the flexible binder urethane may be substituted by a polyether or an alkoxy-functionalized silicon polymer. For instance, according to one embodiment, the polymeric matrix adhesive composition may comprise a cured product of a silane end-capped polymeric component comprising a silane and a urethane component, a polyether diol having an average molecular weight of at least about 4,000 g/mol, a reinforcing extender, and a thixotropic agent. The urethane component may comprise a slow-cure urethane having a functionality (Fn) of about 2.5 to 2.55 and an NCO content of about 15 to 23%. Preferably, a weight ratio of the slow-cure urethane to the polyether diol is about 1:2 to 2:1. In some embodiments, the reinforcing extender and thixotropic agent are hydrophobically modified. In other embodiments, the composition may further comprise about 6-10 wt % of an aliphatic quencher.

In one embodiment, the composition may comprise about 40-55 wt % of a silane end-capped polymer component, about 25-40 wt % of the polyether diol, about 3-7 wt % of the reinforcing extender, and about 2-5 wt % of the thixotropic agent. The weight ratio of the slow-cure urethane to the polyether diol is about 3:2. In another embodiment, the composition may comprise about 15-30 wt % of a silane end-capped polymer component, about 40-55 wt % of the polyether diol, about 3-7 wt % of the reinforcing extender, and about 2-5 wt % of the thixotropic agent. The weight ratio of the slow-cure urethane to the polyether diol is about 3:5.

Table 11 describes an exemplary adhesive composition, referred to as a VCT adhesive.

| Component | Percent weight |
|---|---|
| Slow-cure urethane prepolymer | 40-55 |
| Polyether | 25-40 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |
| Thixotropic agent | 1-5 |
| Methyl ester of rosin | 0.5-1.5 |
| Pigment | 0.005-0.015 |

Table 12 describes an exemplary adhesive composition, referred to as a VSF adhesive.

| Component | Percent weight |
|---|---|
| Slow-cure urethane prepolymer | 10-30 |
| Polyether | 40-55 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |
| Thixotropic agent | 1-5 |
| Methyl ester of rosin | 0.5-1.5 |
| Pigment | 0.005-0.015 |

In some embodiments, the silane end-capped polymeric component comprises a urethane component and a silane component. The silane end-capped polymeric component can form a silanol bridge with the flooring substrate. The silane can be an aminofunctional silane to promote adhesion between inorganic and organic polymers and the like. The silane end-capped polymeric component can range in molecular weight from about 3,000 g/mol to 10,000 g/mol.

In other embodiments, the urethane component facilitates a moisture cure process. In a moisture cure process, water is removed from the adhesive by reacting with the free isocyanate from the excess urethane prepolymer. The water and isocyanate react to form carbamic acid, which is highly unstable and therefore breaks down into an amine and carbon dioxide. The gaseous carbon dioxide is released from the adhesive matrix. The amine reacts with other isocyanate molecules and forms a urea linkage, which contributes to an increased crosslink density of the adhesive.

In some embodiments, the urethane component comprises pure urethane. In other embodiments, the urethane component comprises hybrid polymers of epoxy and urethane. In still other embodiments, the urethane component may be replaced with a polyol of varying molecular weight, ranging from 4,000 g/mol to 10,000 g/mol and having a Hydroxyl number of less than 29.5 mg KOH/g Polyol. As understood by one of ordinary skill, the hydroxyl number is the weight of KOH in milligrams that will neutralize the acid from 1 gram of polyol. In further embodiments, the urethane component may be combined with the polyol of varying molecular weight, but preferably, at least 4,000 g/mol. In some embodiments, the polyol is a polyether polyol or polypropylene glycol. Preferably, a weight ratio of the urethane component to the polyol is about 1:2 to 2:1.

Table 13 describes another non-limiting example of the adhesive composition. Pigment is not required in order to obtain performance results. To achieve a waterproof, pH-resistant formulation, the incorporation of hydrophobically modified additives carried by an aliphatic hydrocarbon quenching agent may be necessary. The quencher may separate the urethanes (e.g., increase the activation energy so that the formulation is not reactive or has little reactivity). The silane component (e.g., gamma-aminopropyltrimethoxysilane) end-caps the urethane prepolymers. Dibutyltindilaurate is an aliphatic metal catalyst used in some embodiments to initiate cure of the adhesive by moisture. In some embodiments, the catalyst is used to accelerate the reaction (e.g., the reaction in the presence of the catalyst may be allowed to react for about 10 to 20 minutes, about 15 to 20 minutes, about 20 to 30 minutes, or more than about 30 minutes, etc.). In other embodiments, substitution of the catalyst by other chemistries is possible. In still other embodiments, the catalyst may not be required.

TABLE 13

| Component | Percent weight |
|---|---|
| Slow-cure urethane prepolymer | 50 |
| Flexible binder urethane prepolymer | 35 |
| Gamma-aminopropyltrimethoxysilane | 1.5 |
| Dibutyltindilaurate | 0.1 |
| Aliphatic fatty acid ester mixture | 10 |
| Vinyltrimethoxysilane | 0.7 |
| Reinforcing extender | 15 |
| Thixotropic agent | 15 |
| 3-glycidoxypropyltrimethoxysilane | 0.35 |
| Pigment | 0.2 |

Table 14.1, Table 14.2, and Table 14.3 describe other non-limiting examples of the adhesive composition. As previously stated, pigment is not required in order to obtain performance results.

TABLE 14.1

| Component | Percent weight |
|---|---|
| Slow-cure urethane prepolymer | 50 |
| Flexible binder urethane prepolymer | 35 |
| Silane (e.g., amino-functional alkoxysilane) | 1.5 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |
| Thixotropic agent | 15 |
| Pigment | 0.2 |

TABLE 14.2

| Component | Ranges of Percent Weights |
|---|---|
| Silane end-capped polymeric material | 65-95 |
| MEKO silane | 3-10 |
| Aliphatic quencher | 5-15 |
| Reinforcing extender | 5-15 |
| Thixotropic went | 3-15 |

TABLE 14.3

| Component | Ranges of Percent Weights |
|---|---|
| Urethane prepolymer | 65-95 |
| Silane (e.g., amino-functional alkoxysilane) | 0.5-5 |
| MEKO silane | 3-10 |
| Aliphatic quencher | 5-15 |
| Reinforcing extender | 5-15 |
| Thixotropic agent | 3-15 |

Table 15 describes another non-limiting example of the adhesive composition. A single urethane prepolymer possessing properties similar to the mixture of the slow-cure urethane prepolymer and the flexible binder urethane prepolymer used in the previous examples is substituted. Pigment is not required in order to obtain performance results.

TABLE 15

| Component | Percent Weight |
|---|---|
| Urethane prepolymer | 85 |
| Silane (e.g., amino-functional alkoxysilane) | 1.5 |
| MEKO silane | 3-10 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |
| Thixotropic went | 15 |
| Pigment | 0.2 |

Table 16 describes another non-limiting example of the adhesive composition. Pigment is not required in order to obtain performance results.

TABLE 16

| Component | Percent weight |
|---|---|
| Slow-cure urethane prepolymer | 45-55 |
| Flexible binder urethane prepolymer | 30-40 |
| Amino-functional alkoxysilane | 1-5 |
| MEKO silane | 3-10 |
| Aliphatic metal catalyst | 0.05-5 |
| Aliphatic hydrocarbon quenching agent | 5-15 |
| Moisture scavenging agent | 0.1-1 |
| Reinforcing extender | 10-20 |
| Thixotropic agent | 10-20 |
| Pigment | 0-1 |

In some embodiments, the desired combination of reactivity and hardness properties of the slow-cure urethane prepolymer and flexible binder urethane prepolymer mixture may be achieved by blending the two components, each with its own specific % NCO content. For example, a slow-cure urethane prepolymer with about 15.8% NCO content can be mixed with a flexible binder urethane prepolymer with about 9.7% NCO content to achieve a desired reactivity and hardness properties that result from the blend. In some embodiments, the percent weight of the slow-cure urethane prepolymer is about 10 to 20%, about 20 to 30%, about 30 to 40%, about 40 to 50%, about 50 to 60%, or about 60 to 70%. In other embodiments, the percent weight of the flexible binder urethane prepolymer is about 10 to 15%, about 15 to 20%, or about 20 to 30%.

Modifying the ratio between the slow-cure urethane prepolymer and the flexible binder urethane prepolymer may allow for varied application and substrate suitability. For example, in some embodiments, the weight ratio of the flexible binder urethane prepolymer to the slow-cure urethane prepolymer is about 7:10. In some embodiments, the weight ratio of the flexible binder urethane prepolymer to the slow-cure urethane prepolymer is greater than about 7:10, for example about 4:5, 9:10, 1:1, 6:5, 3:2, etc. Such an increase over the 7:10 ratio may increase flexibility and elongation. In some embodiments, high ratios of flexible binder urethane prepolymer to slow-cure urethane prepolymer (e.g., greater than about 7:10) provides a dry film suitable for use with flooring substrates that demonstrate dimensional properties of expansion and contraction. A softer or more flexible product may also function as a sound abatement system (e.g., for wood flooring installations). In some embodiments, the ratio of the flexible binder urethane prepolymer to the slow-cure urethane prepolymer is less than about 7:10, for example about 3:5, 1:2, 2:5, 3:10, 1:5, 1:10, etc. Such a decrease below the 7:10 ratio may reduce flexibility and may increase modulus and/or reduce elastic deformation. In some embodiments, the slow-cure urethane prepolymer can comprise urethane, silane, carboxylate, epoxies, polyesters, phenolics, the like, or a combination thereof. The prepolymers are not limited to the aforementioned examples.

In some embodiments, the slow-cure urethane prepolymer can have an NCO content of about 15 to 19%, or about 17 to 21%, or about 19 to 23%. In other embodiments, the flexible binder urethane prepolymer can have an NCO content of about 2 to 5%, or about 4 to 8%, or about 7 to 10%.

Alternatively, a single urethane prepolymer (a custom prepolymer) (e.g., with a % NCO content similar to the resulting % NCO content of the two-component urethane prepolymer mixture, or with a % NCO content less than or greater than the resulting % NCO content of the two-component urethane prepolymer mixture) could be used to achieve a desired reactivity and hardness properties. For example, a urethane prepolymer with a % NCO content of about 12% NCO could have workable reactivity and hardness properties, thereby eliminating the need to blend two separate components. The percent weight of the urethane prepolymer can be about 10 to 20%, about 20 to 30%, about 30 to 40%, about 40 to 50%, about 50 to 60%, about 60 to 70%, or about 70 to 85%. In other embodiments, the urethane prepolymer can have an NCO content of about 7 to 10%, or about 10 to 15%, or about 15 to 18%, or about 18 to 23%.

Altering the ratio to incorporate more of higher functionality urethane creates hard setting adhesives suitable for applications including masonry, concrete anchoring, and concrete laminates. Due to the hydrophobic silanol-bridge bonding mechanism, the adhesive composition exhibits excellent exterior stability to changes in humidity and temperature. Harder setting variants of the formulation provide maximum bond strengths to flexible substrates.

Rubber flooring materials exhibit flexibility and excellent wear properties, but may be susceptible to effects associated with osmotic activity. Rubber has low vapor permeability. When coupled with sub slab moisture vapor emissions, vapor may condense at the bond line between flooring and concrete (which can ultimately cause osmotic blister formation). The adhesive composition provides a hydrophobic bond line that repels liquid moisture effectively preventing osmotic events.

Components of the adhesive may be mixed in sequence (e.g., under high speed dispersion, in an open tank configuration, etc.). In some embodiments, external humidity levels are can range from 50 to 100%, i.e. 70%. As used herein, the CRC Publishing's Coatings Technologies Handbook 3rd Edition defines high speed dispersion as a type of mixing wherein solids are dissolved in a liquid by suctioning the solid and liquid mixture into a disc rotating at high speeds. High speed dispersion is known to one of ordinary skill in the art.

Flooring materials may be modified to promote chemical bond and increase adhesive strength. Without wishing to limit the present invention to any theory or mechanism, it is believed that incorporating adhesion promoters in the composition of the flooring material backing may improve the performance and moisture resistance of the flooring material. In combination with the waterproof adhesive and degassing primer, the flooring material may better resist the effects of elevated moisture exposure, creating a waterproof flooring installation. The adhesive may function to mitigate the moisture alone and develop a permanent waterproof bond in concert with the modified flooring material. The hydrophobic nature of the flooring material coupled with adhesive properties may provide an "all-in-one" moisture mitigation/adhesive solution to flooring installation.

Method of Producing Adhesives

Another embodiment of the present invention features a method of producing a curable pressure sensitive, waterproof adhesive mixture. The method providing a urethane component, providing a first silane component, providing a reinforcing extender, providing a thixotropic agent, mixing the urethane component, the first silane component, the reinforcing extender, and the thixotropic agent to form a dispersion, adding a second silane component to the dispersion, and mixing the second silane component and the dispersion to form the adhesive mixture. Without wishing to limit the invention to a particular theory or mechanism, the method can be effective for producing the adhesive mixture that, when applied to substrate, has a tack-free time of at least about 90 minutes. Further still, the adhesive mixture can be waterproof, hydrolytically stable, and pH-resistant.

In one embodiment, the urethane component may be at a range of about 30-50 wt % of the mixture. In another embodiment, the urethane component can have an average NCO content of about 7 to 23%.

In some embodiments, the urethane component may comprise at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%. In other embodiments, the method may further comprise adding a polyol, such as polypropylene glycol or polyether polyol, or an alkoxy functionalized silicone polymer, as a substitute of the flexible binder urethane or the slow-cure urethane.

In one embodiment, the first silane component may be an amino-functional alkoxysilane polymer having terminal silanol groups. In another embodiment, the first silane component may be at a range of about 2-10 wt % of the mixture. In some embodiments, the reinforcing extender may be at a range of about 2-10 wt % of the mixture. In other embodiments, the thixotropic agent may at a range of about 2-10 wt % of the mixture.

In some embodiments, the second silane component may comprise a methylethylketoximino (MEKO) silane according to the formula:

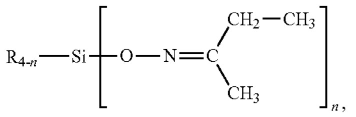

where n ranges from 1 to 4, and R is an alkyl, an alkene, or aryl group. In preferred embodiments, the MEKO silane may be a methyl tris(MEKO)silane, a phenyl tris(MEKO) silane, a vinyl tris(MEKO)silane, a tetrakis(MEKO)silane, a dimethyl bis(MEKO)silane, or a combination thereof. In other embodiments, the second silane component may be at a range of about 2-10 wt % of the mixture.

In one embodiment, the method may further comprise adding about 15-40 wt % of a polyol component having an average molecular weight of at least about 4,000 g/mol to the dispersion, and mixing prior to adding the second silane component. In another embodiment, the method may further comprise adding about 5-15 wt % of an aliphatic quencher to the dispersion, and mixing prior to adding the second silane component. In yet another embodiment, the method may further comprise adding about 2-10 wt % of a tackifier to the dispersion, and mixing prior to adding the second silane component.

In some embodiments, the method may further comprise further adding and mixing carbon nanofibers into the dispersion. The carbon nanofibers may be effective for increasing electrical conductivity of the adhesive composition. In some embodiments, each carbon nanofiber can have a fiber diameter of about 120 to 160 nm, and a dispersive surface energy of about 120 to 140 $mJ/m^2$. Without wishing to limit the invention to a particular theory or mechanism, the carbon nanofibers can provide enhanced electrical conductivity over a broad range along with mechanical reinforcement of the adhesive. Other benefits provided by the carbon nanofibers include improved heat distortion temperatures and increased electromagnetic shielding.

In other embodiments, the method may further comprise adding and mixing an inherently static dissipative (IDP) component into the dispersion. The IDP component may be effective for decreasing surface resistance of the adhesive mixture. Other benefits of the IDP component include the ability to ground potentially hazardous charges. The IDP component can have a surface resistivity of about $1^{07}$ to $1^{10}$ Ω/sq. Non-limiting examples of the IDP component include polypropylene, polystyrene, polyethylene, and acrylic polymers.

In some embodiments, the urethane prepolymer may be dispersed in a solvent comprising a fatty acid ester component, where the solvent homogeneously disperses the urethane prepolymer. In other embodiments, the method further comprises adding a silane. In some embodiments, the wt ratio of a fatty acid component to the urethane prepolymer is 10 to 20:40 to 80. In other embodiments, the ratio of the fatty acid component to the urethane prepolymer is 14 to 16:40 to 50. In other embodiments, the ratio of the fatty acid component to the urethane prepolymer is 14 to 16:65 to 75. In further embodiments, the ratio of the fatty acid component to the urethane prepolymer is 14.5:44. In still further embodiments, the ratio of the fatty acid component to the urethane prepolymer is 14.5:71.5.

In some embodiments, the adhesive mixture is produced at a relative humidity of at least 1%. As understood by one of ordinary skill, the relative humidity is the ratio of the partial pressure of water vapor in an air-water mixture to the saturated vapor pressure of water at a given temperature. In some embodiments, the method can be performed at a relative humidity of about 1% to 20%, about 20% to 40%, about 40%-60%, about 60% to 80%, or about 80% to 100%. Preferably, the method can be performed at any level of relative humidity without requiring vacuum conditions and without adverse effects on the adhesive.

Example 1

The following is a non-limiting example of a method of producing the adhesive composition. Components of the adhesive may be mixed in sequence (e.g., under high speed dispersion, in an open tank configuration, etc.).

1. Add 50% wt. (by weight of total formulation) slow-cure urethane prepolymer with 15.8% NCO content.
2. Add and continuously blend 35% wt. flexible binder urethane prepolymer with 9.7% NCO content.
3. Add and continuously blend 1.5% wt. gamma-aminopropyltrimethoxy-silane.
4. Add and continuously blend 0.1% wt. dibutyltin dilaurate to catalyze the reaction.
5. Allow components 1-4 to blend thoroughly (approximately 15-20 minutes).
6. Add and continuously blend 10% wt. mixture of aliphatic fatty acid ester (non-petroleum base) to quench the urethane reaction.
7. Add and continuously blend 0.7% wt. vinyltrimethoxysilane to scavenge potential atmospheric humidity (from open tank configuration).
8. Add and continuously blend 15% wt. surface-treated natural calcium carbonate reinforcing extender to add body to the formulation and build viscosity.
9. Add and continuously blend 15% wt. surface treated fumed silicate to achieve "high viscosity with low shear, and low viscosity with high shear" appropriate for trowel application.
10. Add and continuously blend 0.35% wt. 3-glycidoxypropyltrimethoxy-silane.
11. Add and continuously blend 0.2% wt. pigment to achieve desired aesthetics.

Example 2

The following is another non-limiting example of a method of producing the adhesive composition. Components of the adhesive may be mixed in sequence (e.g., under high speed dispersion, in an open tank configuration, etc.).

1. Add 43% wt. (by weight of total formulation) slow-cure urethane prepolymer with 16% NCO content. In some embodiments, the slow-urethane prepolymer has a % NCO content between about 5% to 25%.
2. Add 1% wt. (by weight of total formulation) slow-cure urethane prepolymer with 22% NCO content. In some embodiments, the slow-urethane prepolymer has a % NCO content between about 15% to 35%.
3. Add and continuously blend 26% wt. polyether polyol tackifier.
4. Add and continuously blend 1% wt. gamma-aminopropyltrimethoxysilane.
5. Add and continuously blend 0.2% wt. dibutyltin dilaurate to catalyze the reaction.
6. Allow components 1-5 to blend thoroughly (approximately 15-20 minutes).
7. Add and continuously blend 14.5% wt. mixture of aliphatic fatty acid ester (non-petroleum base) to disperse the urethane prepolymer and quench the urethane reaction.
8. Add and continuously blend 0.3% wt. vinyltrimethoxysilane to scavenge potential atmospheric humidity (from open tank configuration).
9. Add and continuously blend 9% wt. surface-treated natural calcium carbonate reinforcing extender to add body to the formulation and build viscosity.
10. Add and continuously blend 3% wt. surface treated fumed silicate to achieve "high viscosity with low shear, and low viscosity with high shear" appropriate for trowel application.
11. Add and continuously blend 1.5% wt. methyl ester of rosin, to plasticize the adhesive and/or reduce moisture sensitivity and/or enhance flexibility and adhesion to low energy flooring substrates.
12. Add and continuously blend 0.5% wt. pigment to achieve desired aesthetics.

Example 3

The following is another non-limiting example of a method of producing the adhesive composition. Components of the adhesive may be mixed in sequence (e.g., under high speed dispersion, in an open tank configuration, etc.).

1. Add 53.5% wt. (by weight of total formulation) slow-cure urethane prepolymer with 16% NCO content. In some embodiments, the slow-urethane prepolymer has a % NCO content between about 5% to 25%.
2. Add and continuously blend 18% wt. flexible binder urethane prepolymer with 9.7% NCO content. In some embodiments, the flexible binder urethane prepolymer has a % NCO content between about 5% to 15%.
3. Add and continuously blend 1% wt. gamma-aminopropyltrimethoxysilane.
4. Add and continuously blend 0.1% wt. dibutyltin dilaurate to catalyze the reaction.
5. Allow components 1-4 to blend thoroughly (approximately 15-20 minutes).
6. Add and continuously blend 14.5% wt. mixture of aliphatic fatty acid ester (non-petroleum base) to disperse the urethane prepolymer and quench the urethane reaction.
7. Add and continuously blend 0.4% wt. vinyltrimethoxysilane to scavenge potential atmospheric humidity (from open tank configuration).

8. Add and continuously blend 9% wt. surface-treated natural calcium carbonate reinforcing extender to add body to the formulation and build viscosity.
9. Add and continuously blend 0.5% wt. pigment to achieve desired aesthetics.

Example 4

The following is a non-limiting example of a method of producing the adhesive composition. Components of the adhesive may be mixed in sequence (e.g., under high speed dispersion, in an open tank configuration, etc.).

1. Add 55-70% wt. (by weight of total formulation) slow-cure urethane prepolymer with 16% NCO content.
2. Add and continuously blend 15-30% wt. flexible binder urethane prepolymer with 9.7% NCO content.
3. Add and continuously blend 0.01-1.5% wt. gamma-aminopropyltrimethoxy-silane.
4. Add and continuously blend 0.001-0.01% wt. dibutyltin dilaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 0.5% wt. pigment to achieve desired aesthetics.

Example 5

The following is another non-limiting example of a method of producing the adhesive composition. Components of the adhesive may be mixed in sequence (e.g., under high speed dispersion, in an open tank configuration, etc.).

1. Add 40-55% wt. (by weight of total formulation) slow-cure urethane prepolymer with 16% NCO content.
2. Add and continuously blend 25-40% wt. polyether polyol.
3. Add and continuously blend 0.01-1.5% wt. gamma-aminopropyltrimethoxy-silane.
4. Add and continuously blend 0.001-0.01% wt. dibutyltin dilaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 0.5% wt. pigment to achieve desired aesthetics.

Example 6

The following is another non-limiting example of a method of producing the adhesive composition. Components of the adhesive may be mixed in sequence (e.g., under high speed dispersion, in an open tank configuration, etc.).

1. Add 10-30% wt. (by weight of total formulation) slow-cure urethane prepolymer with 16% NCO content.
2. Add and continuously blend 40-60% wt. polyether polyol.
3. Add and continuously blend 0.01-1.5% wt. gamma-aminopropyltrimethoxy-silane.
4. Add and continuously blend 0.001-0.01% wt. dibutyltin dilaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 0.5% wt. pigment to achieve desired aesthetics.

Example 7

The following is another non-limiting example of a method of producing the adhesive composition. Components of the adhesive may be mixed in sequence (e.g., under high speed dispersion, in an open tank configuration, etc.).

1. Add 30-50% wt. (by weight of total formulation) urethane prepolymer with 7-23% NCO content.
2. Add and continuously blend 20-40% wt. of polyol.
3. Add and continuously blend 2-8% wt. of amino-functional alkoxysilane.
4. Add and continuously blend 0.01-0.5% wt. dibutyltin dilaurate to catalyze the reaction.
5. Add and continuously blend 8-15% wt. mixture of aliphatic fatty acid ester to disperse the urethane prepolymer and quench the urethane reaction.
6. Add and continuously blend 3-10% wt. hydrophobically-modified reinforcing extender to add body to the formulation and build viscosity.
7. Add and continuously blend 3-10% wt. hydrophobically-modified thixotropic agent.
8. Add and continuously blend 2-7% wt. tackifier.
9. Add and continuously blend 3-10% wt. MEKO silane.
10. Add and continuously blend 0.5% wt. pigment to achieve desired aesthetics.

Example 8

The following is another non-limiting example of a method of producing the adhesive composition. Components of the adhesive may be mixed in sequence (e.g., under high speed dispersion, in an open tank configuration, etc.).

1. Add 30-50% wt. (by weight of total formulation) urethane prepolymer with 7-23% NCO content.
2. Add and continuously blend 20-40% wt. polypropylene glycol.
3. Add and continuously blend 0.01-1.5% wt. amino-functional alkoxysilane.
4. Add and continuously blend 0.001-0.01% wt. dibutyltin dilaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 3-10% wt. vinyltris (MEKO)silane.
11. Add and continuously blend 0.5% wt. pigment to achieve desired aesthetics.

Example 9

The following is another non-limiting example of a method of producing the adhesive composition. Components of the adhesive may be mixed in sequence (e.g., under high speed dispersion, in an open tank configuration, etc.).

1. Add 30-50% wt. (by weight of total formulation) urethane prepolymer with 7-23% NCO content.
2. Add and continuously blend 20-40% wt. polyether polyol.
3. Add and continuously blend 0.01-1.5% wt. amino-functional alkoxysilane.
4. Add and continuously blend 0.001-0.01% wt. dibutyltin dilaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 3-10% wt. methyltris (MEKO)silane.
11. Add and continuously blend 0.5% wt. pigment to achieve desired aesthetics.

Referring to Examples 7-9, without wishing to limit the invention to a particular theory or mechanism, it was surprisingly found that the late (i.e. last or later) addition of the MEKO silane to the formulation appears to suppress the regular cure rate of the adhesive. Instead of following a near linear cure over time (FIG. 1), the cure follows a sigmoidal (s-shaped) cure response. It is theorized that the MEKO silane is functioning to scavenge for moisture, thereby competing with the silane-modified urethane. Hydrolysis of the oxime silane can produce "n" moles of MEKO and 1 mole of a reactive substituted silanetriol. The silanetriols formed can further react with methoxy-substituted groups formed in earlier reactions. These early reactions are set under low moisture conditions in order to promote end-capping of urethane prepolymers and hydrosylated polyethers. The MEKO released can contribute to momentary plasticization of the adhesive mixture prior to its volatilization.

In any of the aforementioned examples, the methods can include a step of adding and continuously blending a desired amount of carbon nanofibers to increase the electrical conductivity of the adhesive. Further still, the method may include a step of adding and continuously blending a desired amount of a static dissipative component to decrease the surface resistance of the adhesive.

Adhesive Applications

It is a further objective of the present invention to provide for methods of using the adhesive. For example, in one the embodiment, the present invention features a method of adhering a first substrate to a second substrate. In some embodiments, the method may comprise providing any of the adhesive mixtures described herein, applying the adhesive mixture to a surface of the second substrate to form an adhesive film on the surface, applying the first substrate to the adhesive film within about 120 minutes after forming the adhesive film, applying pressure to an external surface of the first substrate, the second substrate, or both, thereby bonding the first substrate and the second substrate together, and curing the adhesive film for at least 60 minutes after bonding.

In another embodiment, the invention features a method of installing a flooring material to a floor substrate. The method may comprise providing any of the adhesive mixtures described herein, applying the adhesive mixture to a surface of the floor substrate to form an adhesive film on the surface, applying the flooring material to the adhesive film within about 120 minutes after forming the adhesive film, applying pressure to an external surface of the flooring material, thereby bonding the flooring material to the floor substrate, and curing the adhesive film for at least 60 minutes after bonding.

As used herein, the term "about" refers to plus or minus 10% of the referenced number. For example, an embodiment where a percent weight is about 50% includes a percent weight in a range of 45 and 55%. Furthermore, ratios and percentages are given as weights unless specified otherwise.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A curable pressure sensitive, waterproof adhesive mixture comprising:

a) a urethane component at a range of about 30-50 wt % of the mixture, wherein the urethane component has an average NCO content of about 7% to 23%, wherein the urethane component comprises at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%;

b) a first silane component at a range of about 2-10 wt % of the mixture, wherein the first silane component comprises an amino-functional alkoxysilane polymer having terminal silanol groups;

c) a second silane component at a range of about 2-10 wt % of the mixture, wherein the second silane component is a vinyltris(methylethyl-ketoximino)silane;

d) a reinforcing extender at a range of about 2-10 wt % of the mixture; and e) a thixotropic agent at a range of about 2-10 wt % of the mixture;

wherein when the adhesive mixture is applied to a substrate, the second silane component suppresses the cure rate of the mixture, and thus the adhesive mixture has a tack-free time of at least about 90 minutes, wherein the adhesive mixture is waterproof, hydrolytically stable, and pH-resistant.

2. The mixture of claim 1 further comprising about 15-40 wt % of a polyol component having an average molecular weight of at least about 4,000 g/mol.

3. The mixture of claim 1, further comprising about 5-15 wt % of an aliphatic quencher.

4. The mixture of claim 1, further comprising about 2-10 wt % of a tackifier.

5. The mixture of claim 1 further comprising carbon nanofibers, wherein the nanofibers increase electrical conductivity of the adhesive mixture, and wherein each carbon nanofiber has a fiber diameter of about 120 to 160 nm.

6. The mixture of claim 1, further comprising an inherently static dissipative (IDP) component, wherein the IDP component decreases surface resistance of the adhesive mixture.

7. The mixture of claim 6, wherein the IDP component is selected from a group consisting of polypropylene, polystyrene, polyethylene, and acrylic polymers.

8. A method of adhering a first substrate to a second substrate, the method comprises providing the adhesive mixture of claim 1; applying the adhesive mixture to a surface of the second substrate to form an adhesive film on the surface; applying the first substrate to the adhesive film within about 120 minutes after forming the adhesive film; applying pressure to an external surface of the first substrate, the second substrate, or both, thereby bonding the first substrate and the second substrate together; and curing the adhesive film for at least 60 minutes after bonding.

9. A method of installing a flooring material to a floor substrate, the method comprises providing the adhesive mixture of claim 1; applying the adhesive mixture to a surface of the floor substrate to form an adhesive film on the surface; applying the flooring material to the adhesive film within about 120 minutes after forming the adhesive film; applying pressure to an external surface of the flooring material, thereby bonding the flooring material to the floor substrate; and curing the adhesive film for at least 60 minutes after bonding.

* * * * *